Patented Aug. 9, 1932

1,871,187

UNITED STATES PATENT OFFICE

JAMES D. LINDSAY, OF WHITING, INDIANA, ASSIGNOR TO STANDARD OIL COMPANY, OF WHITING, INDIANA, A CORPORATION OF INDIANA

WAX CONTAINING COMPOSITION

No Drawing.  Application filed January 6, 1927.  Serial No. 159,503.

This invention relates to wax containing compositions and particularly liquid polishes containing waxes of limited solubility.

In known liquid wax polishes the wax-content has been increased over the amount soluble in the liquid at normal temperatures, with the aid of heat. However, on cooling the mixture may congeal to a non-fluid mass or paste.

The present invention provides a satisfactory liquid polish containing large quantities of wax in excess of the amount naturally soluble in the liquid without causing the liquid to congeal.

According to the present invention, hard wax is mechanically pulverized or finely comminuted, for example, by shaving or grinding. The wax may be ground separately and the liquid mixed with the ground wax; or the wax may be ground in the presence of the liquid. The liquid is maintained at ordinary, or a lower temperature during such mixing, or grinding, so that solution of excessive amounts of the wax is avoided.

The polish contains hard waxes, preferably carnauba wax, and usually other waxes such as montan and paraffin. When a mixture of waxes is employed they are preferably melted together before being ground.

The liquid menstruum may suitably be a mixture of oleum or mineral spirits and kerosene, or a distillate from the heavy end of gasoline, or the light end of kerosene. If more than 10 to 12% of carnauba wax is caused to dissolve by heating in such a solvent, the whole mass may congeal to a jelly or even a stiff paste on cooling.

The amount of wax used, according to this invention, may vary, as desired, between that amount which is dissolved at ordinary temperatures and about 25% of the polish, or higher.

If desired, additional ingredients may be added to the wax polish hereinbefore described. For example, polishing abrasives, water, cleansing agents and other substances may be added thereto without departing from the invention.

The following specific example is given by way of illustration: Five parts of paraffin wax and twenty parts of carnauba wax were melted together and cooled. After cooling the wax was ground in a ball mill to a fine state of subdivision. Seventy-five parts of a mixture of oleum spirits and kerosene were added thereto, yielding a liquid polish of high wax content.

I claim:

1. A fluid composition comprising a liquid hydrocarbon and a wax of limited solubility in said liquid, said wax being finely mechanically comminuted and being present in the liquid hydrocarbon in excess of the amount soluble in the said liquid.

2. A fluid composition comprising a liquid hydrocarbon distillate, and carnauba wax in finely mechanically divided condition present in the distillate in an amount in excess of the amount soluble in the distillate.

3. A fluid wax polish comprising a relatively volatile distillate derived from mineral oil and containing about 25% of finely mechanically divided carnauba wax.

4. In the manufacture of a fluid composition comprising a hydrocarbon liquid and a wax of low solubility, the steps of mechanically reducing the wax to a state of fine subdivision and incorporating it with the liquid at a temperature not exceeding normal temperature, the wax being in excess of the quantity soluble in the liquid.

5. In the manufacture of a fluid composition comprising a petroleum distillate and carnauba wax, the steps of mechanically comminuting the wax in the presence of and in contact with the distillate at a temperature not exceeding normal temperature, the wax being in excess of the quantity soluble in the liquid.

6. A fluid composition, liquid at ordinary temperatures, comprising a hydrocarbon liquid containing dissolved wax, and additional wax in finely mechanically divided form suspended therein, the additional quantity of wax being such as would, on solution in the hydrocarbon liquid by heating and on subsequent cooling, form a paste or gel.

7. A fluid composition, liquid at ordinary temperatures, comprising a saturated solution of wax in hydrocarbon liquid together with additional, finely mechanically divided, suspended wax, the proportion of such additional wax being such that, on complete solution in the hydrocarbon liquid present by heating and subsequent cooling to ordinary temperatures, a paste or gel would be formed.

8. A non-aqueous wax polish, fluid at ordinary atmospheric temperatures, comprising a relatively volatile hydrocarbon oil and finely mechanically divided wax particles in suspension therein, the total wax content being in excess of 15%.

9. A non-aqueous wax polish, fluid at ordinary temperatures, comprising a relatively volatile hydrocarbon oil and finely mechanically divided carnauba wax particles in suspension therein, the total wax content being in excess of 15%.

10. A non-aqueous wax polish, fluid at ordinary atmospheric temperatures, comprising a relatively volatile hydrocarbon oil and finely mechanically divided wax particles in suspension therein, the total wax content being in excess of that soluble in the oil under normal temperature conditions.

11. A non-aqueous wax polish, fluid at ordinary atmospheric temperatures, comprising a relatively volatile hydrocarbon oil and finely mechanically divided carnauba wax particles in suspension therein, the total wax content being in excess of that soluble in the oil under normal temperature conditions.

12. A fluid composition comprising a wax and a hydrocarbon liquid, a portion of the wax being suspended in finely mechanically comminuted separate particles in the hydrocarbon liquid and the remainder of said wax being dissolved in said hydrocarbon liquid as a mobile solution, the said suspension wax particles being present in a quantity such that upon their solution in the hydrocarbon liquid and the subsequent precipitation therefrom they would form a paste or gel.

13. A fluid composition comprising carnauba wax and a liquid hydrocarbon distillate, a portion of the wax being suspended in finely mechanically comminuted separate particles in the hydrocarbon distillate and the remainder of said wax being dissolved in said hydrocarbon distillate as a mobile solution, the said suspended wax particles being present in a quantity such that upon their solution in the hydrocarbon liquid and the subsequent precipitation therefrom they would form a paste or gel.

14. The method of producing a fluid composition containing wax of limited solubility which comprises mechanically reducing wax to a state of fine subdivision and incorporating it with a liquid solution of wax and a hydrocarbon liquid at a temperature not exceeding normal temperature, the said subdivided wax being in excess of the quantity soluble in the said wax solution.

JAMES D. LINDSAY.